United States Patent
Kobayashi et al.

(10) Patent No.: US 7,329,386 B2
(45) Date of Patent: Feb. 12, 2008

(54) COLUMN PACKING MATERIAL AND METHOD FOR PRODUCING THE SAME

(75) Inventors: Atsushi Kobayashi, Yokohama (JP); Kazuko Takezawa, Yokohama (JP); Hideki Takasaki, Yokohama (JP); Taketoshi Kanda, Yokohama (JP); Isao Tanaka, Yokohama (JP); Tomoko Kimura, Yokohama (JP); Yutaka Ohtsu, Yokohama (JP)

(73) Assignee: Shiseido Co., Ltd., Tokyo (JP)

( * ) Notice: Subject to any disclaimer, the term of this patent is extended or adjusted under 35 U.S.C. 154(b) by 536 days.

(21) Appl. No.: 10/398,564

(22) PCT Filed: Aug. 30, 2002

(86) PCT No.: PCT/JP02/08782

§ 371 (c)(1),
(2), (4) Date: Apr. 8, 2003

(87) PCT Pub. No.: WO03/019177

PCT Pub. Date: Mar. 6, 2003

(65) Prior Publication Data

US 2004/0043493 A1    Mar. 4, 2004

(51) Int. Cl.
*G01N 30/56* (2006.01)

(52) U.S. Cl. .................. 422/70; 210/198.2; 73/61.53; 73/23.39; 95/88; 96/101; 428/429; 428/447; 427/212; 427/214; 427/220; 502/405

(58) Field of Classification Search .............. 422/70; 436/161; 210/198.2, 656; 73/61.53, 23.39; 95/88; 96/101; 428/429, 447; 427/212, 427/214, 220; 502/405
See application file for complete search history.

(56) References Cited

U.S. PATENT DOCUMENTS 3,666,530 A * 5/1972 Aue et al. ................. 428/429

(Continued)

FOREIGN PATENT DOCUMENTS

JP    03-024455    2/1991

(Continued)

OTHER PUBLICATIONS

Machine translation JP-08-050120.*

(Continued)

*Primary Examiner*—Jan M. Ludlow
(74) *Attorney, Agent, or Firm*—Fei-fei Chao; Andrews Kurth LLP

(57) ABSTRACT

The first subject of this invention is a column packing material comprising:
  a silica gel having a silanol group;
  a first chemical modification group which is bound to said silanol group;
  a silicone polymer for coating the surface of said silica gel; and,
a trimethylsilyl group which is bound to the silanol group on said silicone polymer and/or the silanol group on said silica gel.

The second subject of this invention is a method for producing a column packing material comprising the following steps (A) to (C):
  (A) a step for introducing a first chemical modification group into a silanol group on the surface of a silica gel by reacting the silica gel with a silane coupling agent having said first chemical modification group;
  (B) a step for forming a silicone polymer coating on the surface of said silica gel by polymerizing one or more silicone compounds on the surface of the silica gel after step (A); and,
  (C) a step for trimethylsilylating a silanol group on said silicone polymer and/or a silanol group on said silica gel using an end-capping agent after step (B).

11 Claims, 10 Drawing Sheets

U.S. PATENT DOCUMENTS 4,743,377 A * 5/1988 Ohtsu et al. ................. 210/635
5,203,991 A * 4/1993 Kutsuna et al. .......... 210/198.2

FOREIGN PATENT DOCUMENTS

| JP | 03-233355 | 10/1991 |
| --- | --- | --- |
| JP | 4-166764 A | 6/1992 |
| JP | 08-050120 A | 2/1996 |
| JP | 08-105874 | 4/1996 |
| JP | 2611545 B | 2/1997 |

OTHER PUBLICATIONS

Machine transation JP 08-105874.*

* cited by examiner

COLUMN PACKING MATERIAL AND METHOD FOR PRODUCING THE SAME

RELATED APPLICATIONS

This application claims priority to the Japanese Patent Application No. 2001-263981 dated on Aug. 31, 2001 and is hereby incorporated with reference for all purposes.

FIELD OF THE INVENTION

This invention is related to a column packing material and method for producing the same and, in particular, to improvement of dispersibility of the column packing material.

BACKGROUND OF THE INVENTION

A conventionally-and frequently-employed column packing material has a chemical modification group 116 introduced into a silanol group 114 (Si—OH) group on the surface of a silica gel 112 by means of silylation of the silica gel using a silane compound having various chemical modification groups (FIG. 8). A representative silane compound may for example be an octadecylchlorosilane compound, octylchlorosilane compound, butylchlorosilane compound, cyanopropylchlorosilane compound, phenylchlorosilane compound and the like, among which an octadecylchlorosilane compound is employed to introduce an octadecyl group to form a most frequently employed octadecyl silica gel packing material (ODS).

Any of these packing materials has substantial analytical advantages, but the effect of the silanol group 114 remaining on the surface of the substrate silica gel 112 is problematic. Thus, the residual silanol group 114 exhibits a strong interaction with a polar solute, especially with a basic solute, to adsorb the basic solute, resulting in a peak tailing which leads to a difficulty in obtaining a reliable reproducibility of the chromatogram.

On the other hand, the effect of the residual silanol group 114 was attempted to be reduced by an end-capping method in which a chemical modification group 116-carrying silica gel 112 is re-silylated by an end-capping agent such as trimethyl chlorosilane in a solvent such as toluene and then the residual silanol group 114 is bound chemically to a short alkyl group 122, but this end-capping allowed a substantial amount of the silanol group 114 to be still remaining (FIG. 8).

Accordingly, it was proposed that the reaction between the silica gel and the end-capping agent is conducted in a gas phase instead of a solvent employed conventionally whereby obtaining a column packing material enabling an extremely low effect of the silanol group 114 on the surface of the silica gel 112 (JP-2611545).

Nevertheless, such a packing material involves a poor adhesion of the chemical modification group 116 and the short alkyl group 122 since these groups are bound individually to the silica gel surface although it is improved substantially with respect to the reduction in the residual silanol group 114, and, it is problematic also in terms of the durability because of the entirely exposed hydrophilic moiety of the silica gel 112.

An objective of the invention is to provide a column packing material having an excellent durability and exhibiting an extremely reduced effect of the residual silanol group, and a method for producing the same.

SUMMARY OF THE INVENTION

In view of the problems discussed above, we made an effort and finally discovered that a packing material obtained by coating the surface of a chemical modification group-carrying silica gel with a silicone polymer to end-cap the residual silanol group can achieve the objective mentioned above, whereby establishing the invention.

Namely, the first subject of this invention is a column packing material comprising:
- a silica gel having a silanol group;
- a first chemical modification group which is bound to said silanol group;
- a silicone polymer for coating the surface of said silica gel; and,
- a trimethylsilyl group which is bound to the silanol group on said silicone polymer and/or the silanol group on said silica gel.

The first embodiment of the said column packing material is a column packing material comprising:
- a silica gel having a silanol group;
- a first chemical modification group which is bound to said silanol group;
- a silicone polymer consisting of a silicone compound having 2 or more hydrosilyl group in one molecule in which the molecules are crosslinked with each other to coat substantially the entire surface of said silica gel as a network; and,
- a trimethylsilyl group which is bound to a silanol group generated from a residual hydrosilyl group on said silicone polymer.

In said column packing material, it is preferable that the silicone compound is 1,3,5,7-tetramethylcyclotetrasiloxane.

It is preferable that said column packing material has a second chemical modification group which is bound to a residual hydrosilyl group on said silicone polymer.

Also, in said column packing material, it is preferable that the second chemical modification group is an ion exchange group.

Also, in said column packing material, it is preferable that the second chemical modification group is a sulfone group, carboxyl group or amino group.

The second embodiment of the said column packing material is a column packing material comprising:
- a silica gel having a silanol group;
- a first chemical modification group and a trimethylsilyl group which are bound to said silanol groups; and,
- a silicone polymer which coats a part of the surface of said silica gel by the crosslinking of silyl isocyanate compounds with each other.

In said column packing material, it is preferable that the silyl isocyanate compound is methylsilyl triisocyanate.

Furthermore, in said column packing material, it is preferable that the first chemical modification group is a 1 to 30 carbon atom-carrying straight hydrocarbon group, branched hydrocarbon group, cyclic hydrocarbon group, or a substituted hydrocarbon group having as a substituent a cyano group, hydroxyl group, carboxyl group, acid amide group, imide group, sulfone group, amino group or glyceroyl group.

Also, it is preferable that the first chemical modification group is a triacontyl group, octadecyl group, octyl group, phenyl group, cyano group, methyl group or epoxy group.

The second subject of this invention is a method for producing a column packing material comprising the following steps (A) to (C):

(A) a step for introducing a first chemical modification group into a silanol group on the surface of a silica gel by reacting the silica gel with a silane coupling agent having said first chemical modification group;

(B) a step for forming a silicone polymer coating on the surface of said silica gel by polymerizing one or more silicone compounds on the surface of the silica gel after step (A); and, (C) a step for trimethylsilylating a silanol group on said silicone polymer and/or a silanol group on said silica gel using an end-capping agent after step (B).

Also, a method for producing a column packing material comprising the following steps (A') to (D'):

(A') a step for introducing a first chemical modification group into a silanol group on the surface of a silica gel by reacting the silica gel with a silane coupling agent having said first chemical modification group;

(B') a step for forming a silicone polymer coating as a network on substantially the entire surface of said silica gel by polymerizing one or more of silicone compounds having two or more hydrosilyl groups in one molecule after step (A');

(C') a step for introducing a second chemical modification group into the silicone polymer by reacting a vinyl compound having said second chemical modification group after step (B'); and, (D') a step for trimethylsilylating a silanol group generated from a residual hydrosilyl group on said silicone polymer using an end-capping agent after step (C').

It is preferable that said method comprises a step for crosslinking a residual hydrosilyl group on said silicone polymer.

DETAILED DESCRIPTION OF THE PREFERRED EMBODIMENT

A column packing material of the invention exhibits an excellent adhesion of a chemical modification group and an excellent durability since the silica gel is coated with a silicone polymer. In addition, the effect of the silanol group is very low since the residual silanol group has been trimethylsilylated using an end-capping agent.

(1) The First Embodiment

Figure 1:
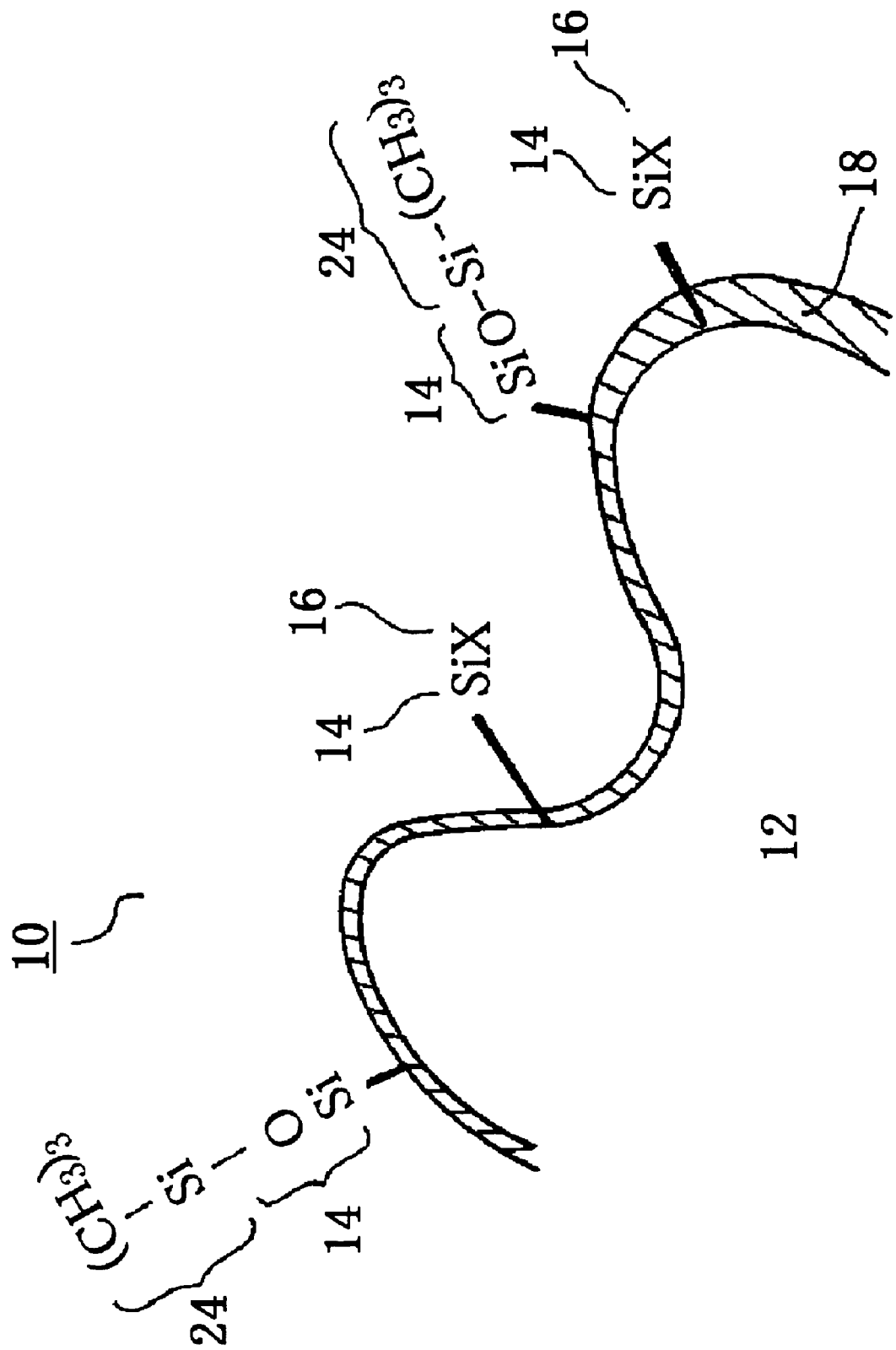
FIG. 1 shows a schematic view of the first embodiment of column packing material of the present invention.

A column packing material according to the first embodiment of the invention, which is shown in FIG. 1, comprises:
a silica gel 12 having a silanol group 14;

a first chemical modification group 16 which is bound to said silanol group 14;

a silicone polymer 18 consisting of a silicone compound having 2 or more hydrosilyl group in one molecule in which the molecules are crosslinked with each other to coat substantially the entire surface of said silica gel as a network; and, a trimethylsilyl group 24 which is bound to a silanol group 14 generated from a residual hydrosilyl group on said silicone polymer 18.

A preferred method for producing a column packing material of the first embodiment of the invention is discussed below.

Step (A)

Figure 2:
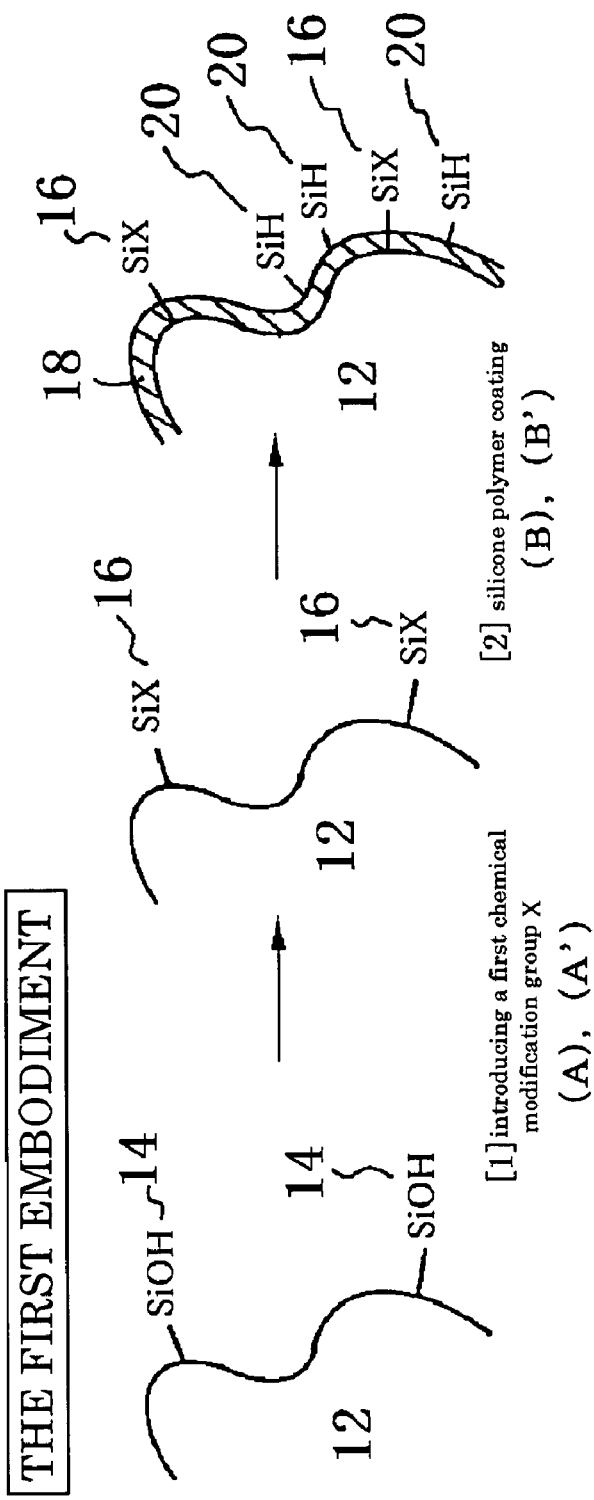
FIG. 2 shows a schematic view of a method for producing the first embodiment of column packing material of the present invention.
Figure 1:
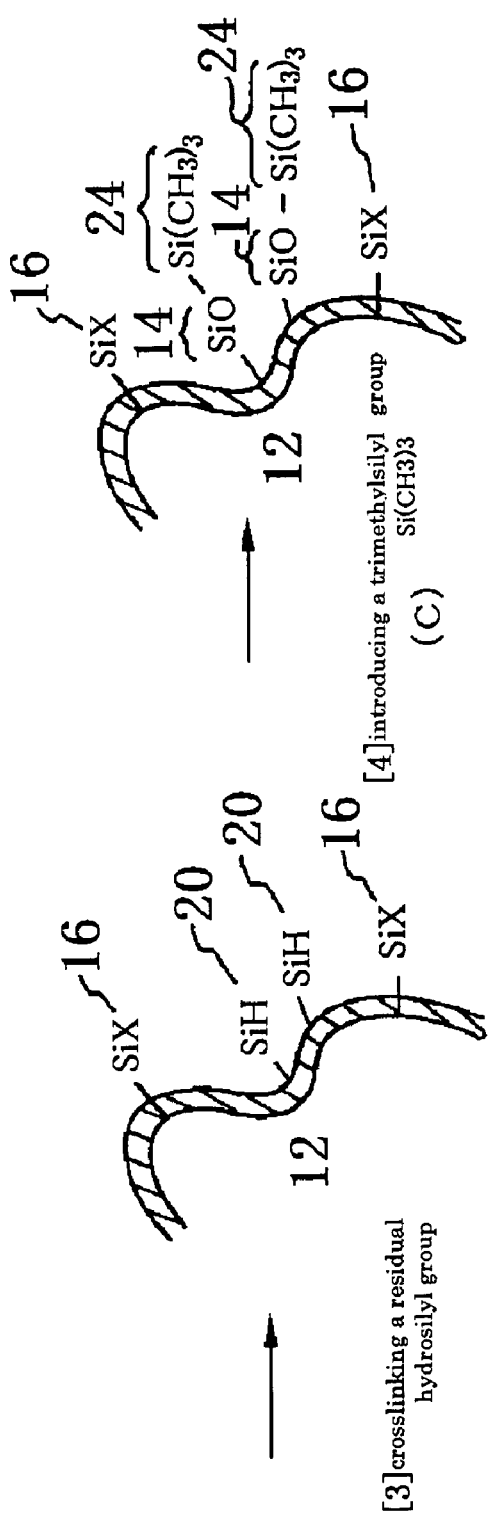
Figure 2:
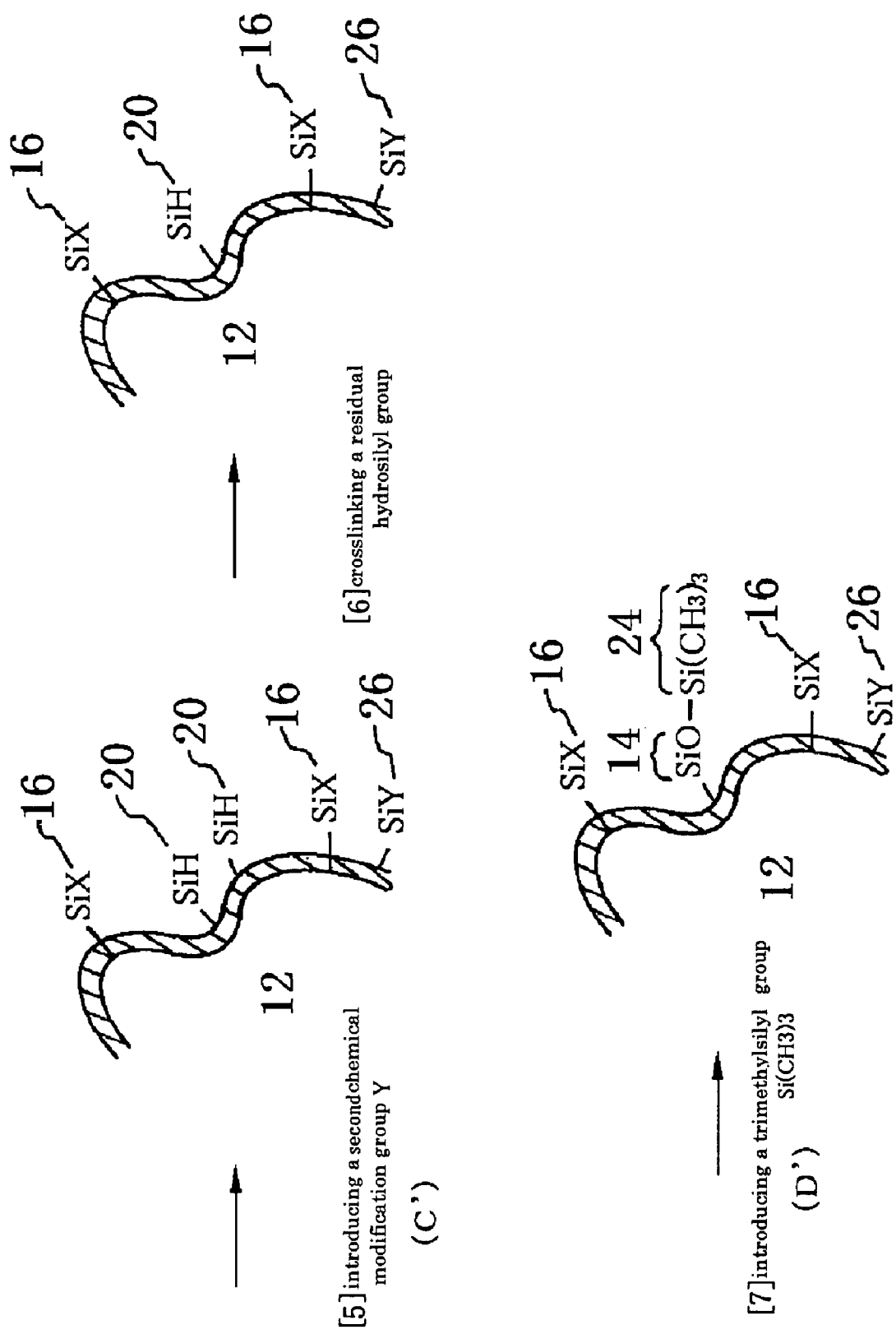

In the first embodiment of an inventive column packing material, a silica gel 12 is first reacted with a silane coupling agent having a chemical modification group 16 to introduce said chemical modification group 16 into a silanol group 14 on the surface of the silica gel (FIG. 2).

While the shape of the silica gel employed in this invention is not limited particularly, a spherical or pelleted silica gel whose mean particle size is 1 to 200 μm, preferably 3 to 50 μm, whose micropore size is 1 to 100 nm, preferably 4 to 50 nm, and whose specific surface area is 50 to 800 m$^2$/g, preferably 100 to 600 m$^2$/g is employed preferably.

A silane coupling agent employed here may for example be a chlorosilane or alkoxysilane having as chemical modification groups 1 to 3 groups selected from an alkyl group having 1 to 30 carbon atoms such as triacontyl group, octadecyl group, octyl group and n-butyl group, an aryl group having 6 to 30 carbon atoms such as a phenyl group and a substituted alkyl group having 1 to 30 carbon atoms, one or more of whose hydrogen atoms are substituted by a cyano group, hydroxyl group, carboxyl group, acid amid group, imide group, sulfone group, amino group or glyceroyl group, as well as a cyclosiloxane or polysiloxane having one or more, for example, 6 to 100, chemical modification groups listed above. The alkoxy group in the alkoxysilane described above is preferably a lower alkoxy group having 1 to 3 carbon atoms such as a methoxy group. The cyclosiloxane preferably has 3 to 50 silicon atoms forming a ring via oxygen atoms. The polysiloxane preferably has 2 to 50 silicon atoms.

A silane coupling agent described above may for example be one having octadecyl groups such as dimethyloctadecylchlorosilane, methyloctadecylmethoxysilane, methyloctadecyldichlorosilane, methyloctadecyldimethoxysilane, octadecyltrichlorosilane, octadecyltrimethoxysilane and 1,3,5,7-tetraoctadecyl-1,3,5,7-tetramethylcyclotetrasiloxane, one having octyl groups such as dimethyloctylchlorosilane methyloctyldichlorosilane, octyltrichlorosilane, 1,3,5,7-tetraoctyl-1,3,5,7-tetramethylcyclotetrasiloxane, one having n-butyl groups such as n-butyldimethylchlorosilane, n-butylmethyldichlorosilane, n-butyltrichlorosilane, 1,3,5,7-tetra-n-butyl-1,3,5,7-tetramethylcyclotetrasiloxane, one having phenyl groups such as triphenylchlorosilane, methyldiphenylchlorosilane, dimethylphenylchlorosilane, diphenyldichlorosilane, methylphenyldichlorosilane, phenyltrichlorsilane, benzyltrichlorosilane and 1,3,5,7-tetraphenyl-1,3,5,7-tetramethylcyclotetrasiloxane and one having cyanopropyl groups such as 3-cyanopropyldimethylchlorosilane, 3-cyanopropylmethylchlorosilane and 3-cyanopropyltrichlorosilane.

Among the silane coupling agents listed above, those employed preferably are dichlorosilane compounds such as methyloctadecyldichlorosilane, trichlorosilane compounds such as octadecyltrichlorosilane, dialkoxysilane compounds such as methyloctadecyldimethoxysilane, trialkoxysilane compounds such as octadecyltrimethoxysilane, or cylosiloxane compound such as 1,3,5,7-tetraoctadecyl-1,3,5,7-tetramethylcyclotetrasiloxane as well as polysiloxane compounds. By using such compounds, the cleavage of a chemical modification group upon coating with a silicone polymer in Step (B) can satisfactorily be prevented.

The reaction between the silane coupling agent and a silica gel can be accomplished by a method known per se under known conditions, for example by means of a contact over a period of 2 hours or longer in a gas or liquid phase at 50 to 300° C. in the presence of a solvent. A preferred catalyst is a metal catalyst such as a ruthenium, rhodium, palladium, osmium, iridium or platinum compound. A palladium compound and a platinum compound are preferred especially.

Step (B)

A silica gel modified chemically as described above is then brought into contact with a silicone compound having two or more hydrosilyl groups (Si—H group) 20 in one molecule to effect a surface polymerization whereby forming a silicone polymer 18 coating (FIG. 2).

A silicone compound employed in the invention is one or more of those represented by Formula (I):

$$(R^1HSiO)_a(R^2R^3SiO)_b(R^4R^5R^6SiO_{1/2})_c \quad (I)$$

wherein each of $R^1$ to $R^6$ denotes, independently of one another, a hydrogen atom or a hydrocarbon group having 1 to 10 carbon atoms substituted by at least one halogen atom; $R^1$, $R^2$ and $R^3$ are not simultaneously hydrogen atoms; each of a and b denotes, independently of one another, 0 or integer of 1 or more; c is 0 or 2; and the sum of a, b and c is an integer of 3 or more, which is characterized by two or more hydrosilyl groups present in one molecule.

The term "hydrocarbon group" as any of $R^1$ to $R^6$ described above means a straight or branched, cyclic alkyl group, especially a lower alkyl group having 1 to 4 carbon atoms (such as methyl group, ethyl group, n-propyl group, n-butyl group); cycloalkyl group (such as cyclohexyl group); cycloalkenyl group (such as cyclohexenyl group); aryl group (such as phenyl group), naphthyl group; aryl substituted alkyl group (such as phenyl methyl group and phenyl ethyl group); and alkyl substituted aryl group (such as methyl phenyl group).

A silicone compound represented by Formula (I) shown above is classified into two types.

The first type is a cyclic silicone compound having a hydrosilyl group, which corresponds to Formula (I) shown above where in c=0 represented by Formula (II):

$$(R^1HSiO)_{a1}(R^2R^3SiO)_{b1} \quad (II)$$

wherein $R^1$, $R^2$ and $R^3$ are as defined above, a1 and b1 have the meanings of a and b, respectively, and the sum of a1 and b1 is an integer of 3 or more.

In the invention, a cyclic silicone compound represented by Formula (II) wherein each of $R^1$, $R^2$ and $R^3$ denotes, independently of one another, a lower alkyl group (especially methyl group, ethyl group, n-propyl group or n-butyl group), aryl group or phenyl group, and the sum of a1 and b1 is 3 to 100 is employed preferably. While $R^1$, $R^2$ and $R^3$ may be different groups, they are preferably the same groups.

A particularly preferred cyclic silicone compound correspond to Formula (II) shown above wherein b1=0 and which represented by Formula (III):

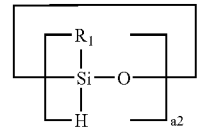

wherein $R^1$ is as defined above and a2 is an integer of 3 or more.

For example, tetrahydro tetramethyl cyclotetrasiloxane, tetrahydro tetraethyl cyclotetrasiloxane, tetrahydro tetraphenyl cyclotetrasiloxane, tetrahydro dodecamethyl cyclooctanesiloxane, and tetrahydro tetraoctyl cyclooctanesiloxane can be listed.

A compound represented by Formula (III) wherein R1 is a methyl group or ethyl group and a2 is 3 to 100 is preferred, with one wherein R1 is a methyl group and a2 is 4, i.e., 1,3,5,7-tetramethylcyclotetrasiloxane being especially preferred.

The second type of the silicone is a straight-chained silicone compound having a hydrosilyl group, which correspond to Formula (I) shown above where in c=2 represented by Formula (IV):

$$(R^1HSiO)_{a3}(R^2R^3SiO)_{b3}(R^4R^5R^6SiO_{1/2})_2 \quad (IV)$$

wherein $R^1$ to $R^6$ are as defined above, a3 and b3 have the meanings of a and b, respectively, and the sum of a3 and b3 is an integer of 1 or more.

In the invention, a cyclic silicone compound represented by Formula (IV) wherein each of $R^1$ to $R^6$ denotes, independently of one another, a lower alkyl group (especially methyl group, ethyl group, n-propyl group or n-butyl group), aryl group or phenyl group, and the sum of a3 and b3 is 3 to 100 is employed preferably. While $R^1$ to $R^6$ may be different groups, they are preferably the same groups.

As a preferred straight-chained silicone compound, 1,1, 1,2,3,4,4,4-octamethyl tetrasiloxane, 1,1,2,3,4,5,5,5-nonamethyl pentasiloxane, and 1,1,1,2,3,4,5,6,6,6-decamethyl hexasiloxane can be listed.

In the invention, a silicone compound described above may be employed alone or in a mixture of two or more.

A silicone compound represented by Formula (I) shown above is brought into contact with a silica gel in a gas or liquid phase.

The contact in the gas phase (gas phase treatment) may be accomplished for example by bringing the vapor of a silicone compound described above in the state of a molecule into contact with the surface of a silica gel at a temperature of 300° C. or below using an air-tight container or by bringing a gaseous mixture of a silicone compound described above and a carrier gas into contact with silica gel at a temperature of 300° C. or below.

On the other hand, the contact in the liquid phase (liquid phase treatment) may be accomplished for example by adding 0.01 to 1 parts by mass as a silicone compound described above of a 1 to 50% by mass solution of the silicone compound in a volatile solvent capable of dissolving the silicone compound such as benzene, dichloromethane or chloroform, especially hexane, to 1 part by mass of a silica gel. In this case, the addition is made preferably with stirring.

The surface polymerization of a silicone compound on the silica gel surface can be accomplished by allowing the silica gel which had been subjected to the contact treatment as described above to stand with or without stirring for a period of 2 hours or longer at a temperature of 50 to 300° C.

This surface polymerization can be conducted without any particular catalyst since it can be promoted by the effect of the surface active points of the silica gel itself. The term "active point" mentioned here means a point capable of catalyzing the polymerization of a silicone compound having a hydrosilyl group, including an acid point, base point, oxidization point or reduction point. The surface polymerization is continued until substantially all of the active points on the silica gel surface are coated with the silicone polymer.

When the activity of a silica gel itself is extremely low, then the silica gel before or after the contact treatment described above may be combined appropriately with an alkaline catalyst such as sodium hydroxide, potassium hydroxide, lithium hydroxide, ammonium hydroxide or calcium hydroxide prior to the polymerization.

There are two polymerization mode of a silicone compound on the surface of a silica gel on the stage where the silica gel and the silicone compound are allowed to be in contact in a gaseous or liquid phase with heating. One mode is a crosslinking polymerization between the hydrosilyl groups to form a network structure on the silica gel surface. Thus, the polymerization proceeds as follows:

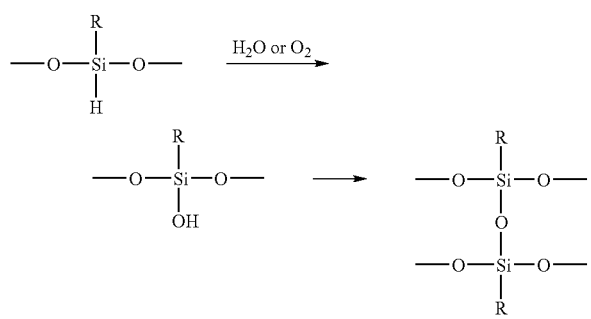

wherein R is a hydrocarbon group $R^1$ to $R^6$.

The other mode is a larger ring formation of a cyclic silicone compound or a larger chain formation of a linear silicone compound as a result of repetitive cleavage and re-binding of the siloxane bonds. Such a polymerization mode can be represented by Scheme:

or by Scheme:

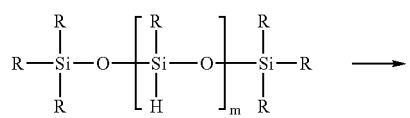

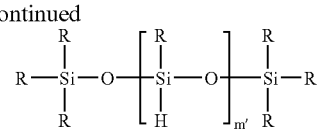

in both of which R is as defined above, m is the sum of a and b, and m' is an integer lager than m.

This polymerization is promoted by the surface active points possessed by a silica gel.

The two discrete polymerization described above may be advanced independently of each other or concomitantly with each other depending on the types of the silica gel and the reaction conditions (temperature, catalyst and the like). The degree of the polymerization may also vary.

The mean molecular weight of a silicone polymer formed on the surface of a silica gel by a polymerization described above is $1.5 \times 10^5$ or higher. A silicone compound, when imparted with a higher molecular weight by a polymerization, becomes less soluble in water or an organic solvent and also becomes difficult to be examined for its molecular weight by extracting the polymer, and it is also impossible to measure the molecular weight of the polymer when it is coated on the silica gel surface.

Accordingly, the polymers on various stage of the polymerization being advanced were extracted with chloroform and the molecular weights were determined as that of polystyrene, and the results indicated that the polymers of $1.5 \times 10^5$ at maximum were present. Thus, the molecular weight of the polymer subjected to a sufficient polymerization in the state before being extracted with chloroform may be regarded to be $1.5 \times 10^5$ or higher, but it is difficult to determine the molecular weight more precisely.

The amount of a silicone compound coated on the surface of a silica gel is preferably 1 to 50% by mass based on the mass of the silica gel. An amount exceeding 50% by mass results in a difficulty in accomplishing a sufficient polymerization to allow an increased amount of the silicone compound to be just deposited on the silica gel surface or on a first chemical modification group, which is not preferable for a packing material. An amount less than 1% by mass leads to a difficulty in covering the entire surface of the silica gel with the silicone polymer coating, resulting in an insufficient exertion of the advantage of the invention.

A silicone polymer-coated silica gel described above has a hydrosilyl group 20 remaining on the silicone polymer. While a hydrosilyl group-containing packing material can be used stably when using a solvent which is inert to the hydrosilyl group such as acetonitorile, it may generate hydrogen and degrade the column when using an alcoholic mobile phase. Accordingly, by crosslinking the hydrosilyl group 20 in the presence of a catalyst, the packing material can be used stably even when using an alcoholic mobile phase (FIG. 2).

A crosslinking catalyst may for example be an alkaline catalyst such as sodium hydroxide, potassium hydroxide, calcium hydroxide, ammonium hydroxide, lithium hydroxide or sodium carbonate, an alkyl metal catalyst such as dibutyltin, or an alkylamine catalyst such as tributylamine and the like. When a residual hydrosilyl group is allowed to stand at room temperature or with heating or is heated under reflux for a period of 1 to 40 hours in a 0.01 to 10% by mass solution of a catalyst listed above in water, alcohol or any other organic solvent, it is crosslinked in accordance with the scheme shown below.

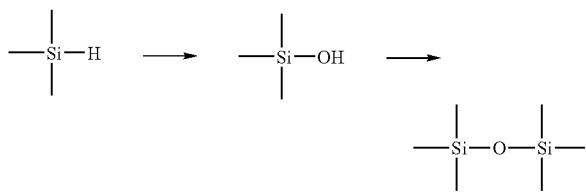

As described above, the contact between a low molecular silicone compound and a silica gel in the invention allows the silicone compound to penetrate into micropores of the silica gel where it undergoes the polymerization with depositing to substantially the entire surface of the silica gel, resulting in the formation of an extremely thin coating of the silicone polymer over the silica gel surface, which leads to an improved durability while keeping the characteristics of the silica gel and the chemical modification group.

Step (C)

In a silicone polymer-coated silica gel described above, a hydrosilyl group 20 is still remaining even after conducting a crosslinking reaction.

Accordingly, a silanol group 14 generated from a residual hydrosilyl group 20 is sequestered by means of trimethylsilylation, whereby obtaining a column packing material exhibiting an extremely low effect of the silanol group 14 (FIG. 2).

The trimethylsilylation is conducted by bringing a silicone polymer-coated silica gel into contact with an end-capping agent in a gaseous or liquid phase. For example, in a mixture of 1 to 20 parts by mass of toluene, 0.5 to 3 parts by mass of trimethylchlorosilane, 1 to 6 parts by weight of hexamethyldisilazane and 1 to 8.5 parts by mass of pyridine, the silica gel described above is heated under reflux with stirring for 2 to 24 hours, or in a tightly sealed container each of trimethylchlorosilane, hexamethyldisilazane, trimethylmethoxysilane or trimethylethoxysilane is heated individually in the presence of the silica gel described above at 40° C. to 150° C.

In this embodiment, a column packing material having an excellent durability and a wide-ranged supporting ability which is not achieved by a conventional chemical bond type packing material can be obtained as a result of the combination of a first chemical modification group 16 in Step (A) with the substituents $R^1$ to $R^6$ on a silicone compound represented by Formula (I) shown above in Step (B).

A column packing material according to the first embodiment of the invention may contain a second chemical modification group on the silicone polymer. Such a column packing material can be produced by a preferable method described below.

Step (A') and Step (B')

Step (A') and Step (B') may be conducted similarly to Step (A) and Step (B) described above (FIG. 2, [2]).

Step (C')

After Step (B'), a chemical modification group 26 is introduced further into a residual hydrosilyl group on a silicone polymer described above using a vinyl compound group (FIG. 2).

Such a vinyl compound may be any of ethylene, an α-olefin compound, symmetric vinyl compound or asymmetric vinyl compound.

Such a vinyl compound may for example be a compound represented by Formula (V):

$$R^7—CH=CH—R^8 \quad (V)$$

wherein each of $R^7$ and $R^8$ denotes, independently of each other, a hydrogen atom, an alkyl group having 1 to 40 carbon atoms, a cycloalkyl or cycloalkenyl group having 4 to 8 carbon atoms or an aryl group optionally substituted by an alkyl group having 1 to 20 carbon atoms, and said alkyl group, cycloalkyl group, cycloalkenyl group, alkyl-substituted aryl group or aryl group may be substituted by a halogen atom, hydroxyl group, carboxyl group, amino group, cyano group, alkoxycarbonyl group, aryloxycarbonyl group or sulfonate group.

A vinyl compound represented by Formula (V) may be ethylene whose $R^7$ and $R^8$ are both hydrogen atoms, a vinyl compound in which one of $R^7$ and $R^8$ is a hydrogen atom and the other is a substituent other than a hydrogen atom, such as an α-olefin compound, a symmetric vinyl compound in which both of $R^7$ and $R^8$ are the same substituents other than hydrogen atoms or an asymmetric vinyl compound in which $R^7$ and $R^8$ are the different substituents other than hydrogen atoms.

A preferred vinyl compound is a vinyl compound in which each of $R^7$ and $R^8$ in Formula (V) shown above denotes, independently of each other, a hydrogen atom; an alkyl group having 4 to 20 carbon atoms such as 1-hexyl group, 1-octyl group, 1-decyl group, 1-dodecyl group, 1-hexadecyl group or 1-octadecyl group; a cyclohexyl group or cyclohexenyl group; a phenyl group or naphthyl group; or a phenyl group or naphthyl group substituted by a lower alkyl group having 1 to 6 carbon atoms.

Another preferred vinyl compound is a compound in which at least one of $R^7$ and $R^8$ in Formula (V) shown above denotes a group other than a hydrogen atom which is substituted by a functional group (halogen atom, hydroxyl group, carboxyl group, amino group, cyano group, alkoxycarbonyl group, aryloxycarbonyl group, sulfonate group).

As described above, the characteristics of a packing material can be controlled as desired by selecting the vinyl compound as appropriate.

The reaction between a vinyl compound described above and a silicone polymer-coated powder can be conducted by hydrosilylation known per se. The reaction described above may be conducted for example by means of a contact with a catalyst over a period of 2 hours or longer in a gaseous or liquid phase at 50 to 300° C. in the presence of a solvent.

A catalyst may preferably be a metal catalyst such as ruthenium, rhodium, palladium, osmium, iridium or platinum compound. A palladium compound and a platinum ruthenium are preferred particularly. A palladium-based catalyst may for example be palladium (II) chloride, tetraaminepalladous (II) ammonium chloride, palladium (II) oxide, palladium (II) hydroxide and the like. A platinum-based catalyst may for example be platinum (II) chloride, tetrachloroplatinic acid (II), platinum (IV) chloride, hexachloroplatinic acid (IV), hexachloroplatinic acid (IV) ammonium, platinum (II) oxide, platinum (II) hydroxide, platinum (IV) dioxide, platinum (IV) oxide, platinum (IV) disulfide, platinum (IV) sulfide, potassium hexachloroplatinate (IV) and the like.

A silicone polymer into which a chemical modification group has been introduced allows a hydrosilyl group to remain in the silicone polymer because of a steric hindrance. The presence of the hydrosilyl group may lead to the generation of hydrogen and to the degradation of the column when using an alcoholic mobile phase as described above. Accordingly, it is preferred to crosslink the residual hydrosilyl group similarly to the crosslinking treatment described above (FIG. 2).

Step (D')

Even after such a crosslinking treatment, some of the hydrosilyl groups 20 may remain, and it is preferred to trimethylsilylate a silanol group 14 generated from the residual hydrosilyl group 20. This trimethylsilylation can be conducted as in Step (C) described above (FIG. 2).

The introduction of a second chemical modification group yields a column packing material having a wider-ranged supporting ability can be obtained due to the presence of a first chemical modification group 16 in Step (A') and the substituents $R^1$ to $R^6$ in a silicone compound represented by Formula (I) shown above in Step (B') further in combination with the substituents $R^7$ and $R^8$ in a vinyl compound represented by Formula (V) shown above in Step (C').

A conventional silica gel-based packing material may undergo a marked peak tailing resulting from a basic compound and the like because of the effect of a residual silanol group derived from the base silica gel. However, a column packing material according to the first embodiment of the invention exhibits an extremely reduced effect of the silanol group which is achieved by trimethylsilylation of a silanol group generated from a residual hydrosilyl group on a silicone polymer. In addition, the conventional silica gel-based packing material entails a durability problem because of the entirely exposed silica gel surface which leads to a poor deposition of a chemical modification group. However, a column packing material according to the first embodiment of the invention is imparted with a durability by applying a dense silicone polymer coating.

(2) The Second Embodiment

Figure 3:
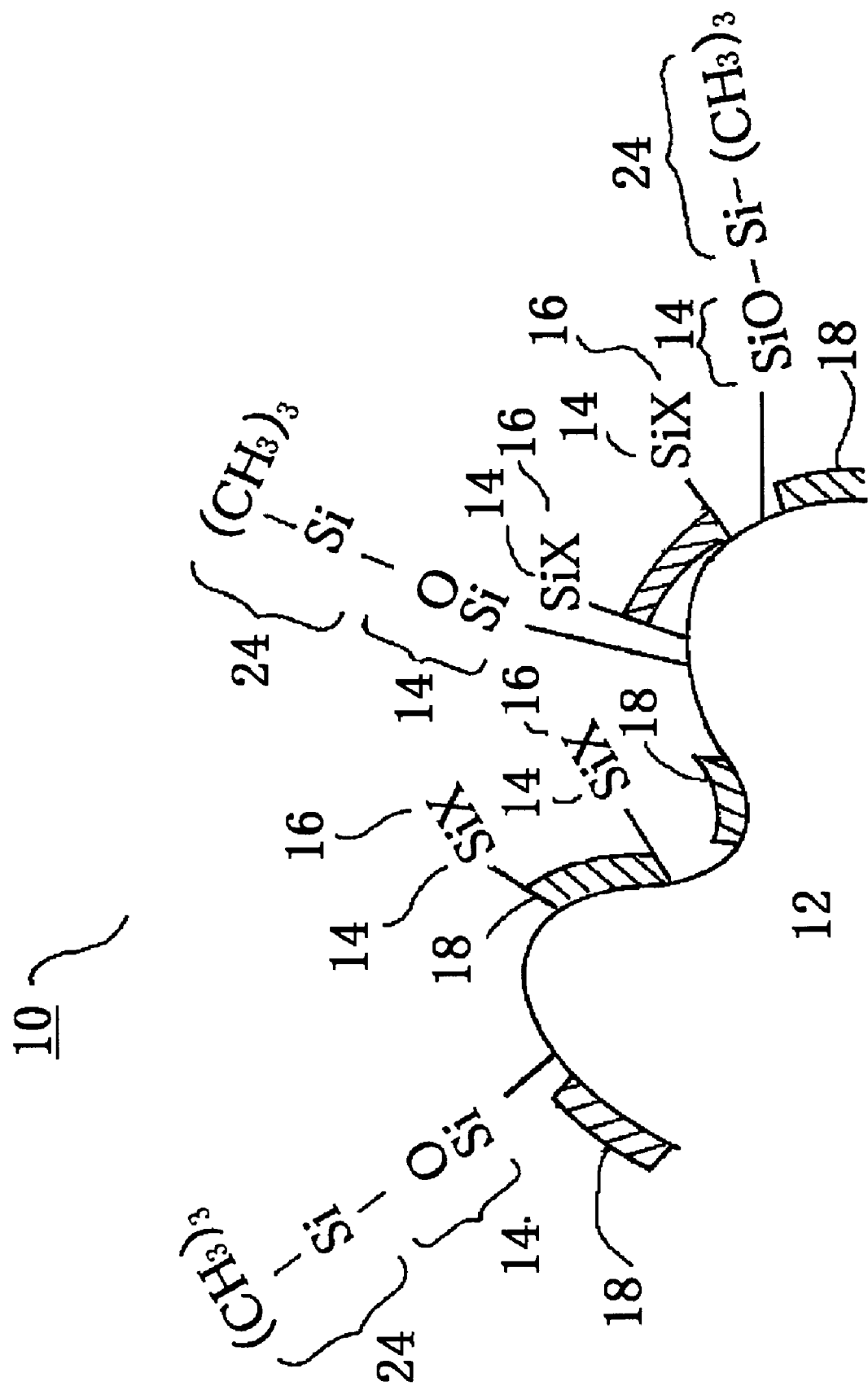
FIG. 3 shows a schematic view of the second embodiment of column packing material of the present invention.

A column packing material according to the second embodiment of the invention, which is shown in FIG. 3, comprises:

a silica gel 12 having a silanol group 14;

a first chemical modification group 16 and a trimethylsilyl group 22 which are bound to said silanol groups 14; and, a silicone polymer 18 which coats a part of the surface of said silica gel by the crosslinking of silyl isocyanate compounds with each other.

A preferred method for producing a column packing material according to the second embodiment of the invention is discussed below.

Step (A1)

Figures 1, 4:
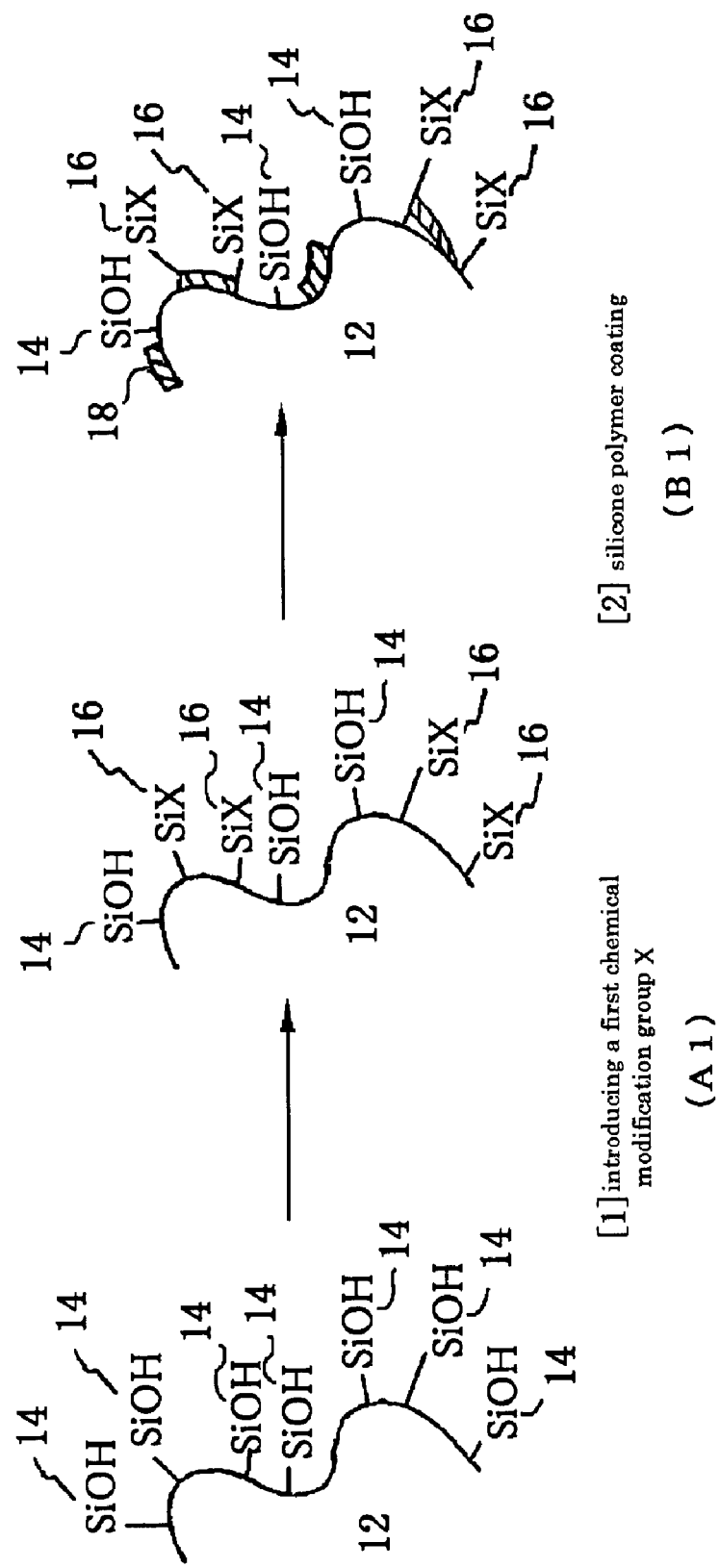
FIG. 4 shows a schematic view of a method for producing the second embodiment of column packing material of the present invention.
Figures 2, 4:
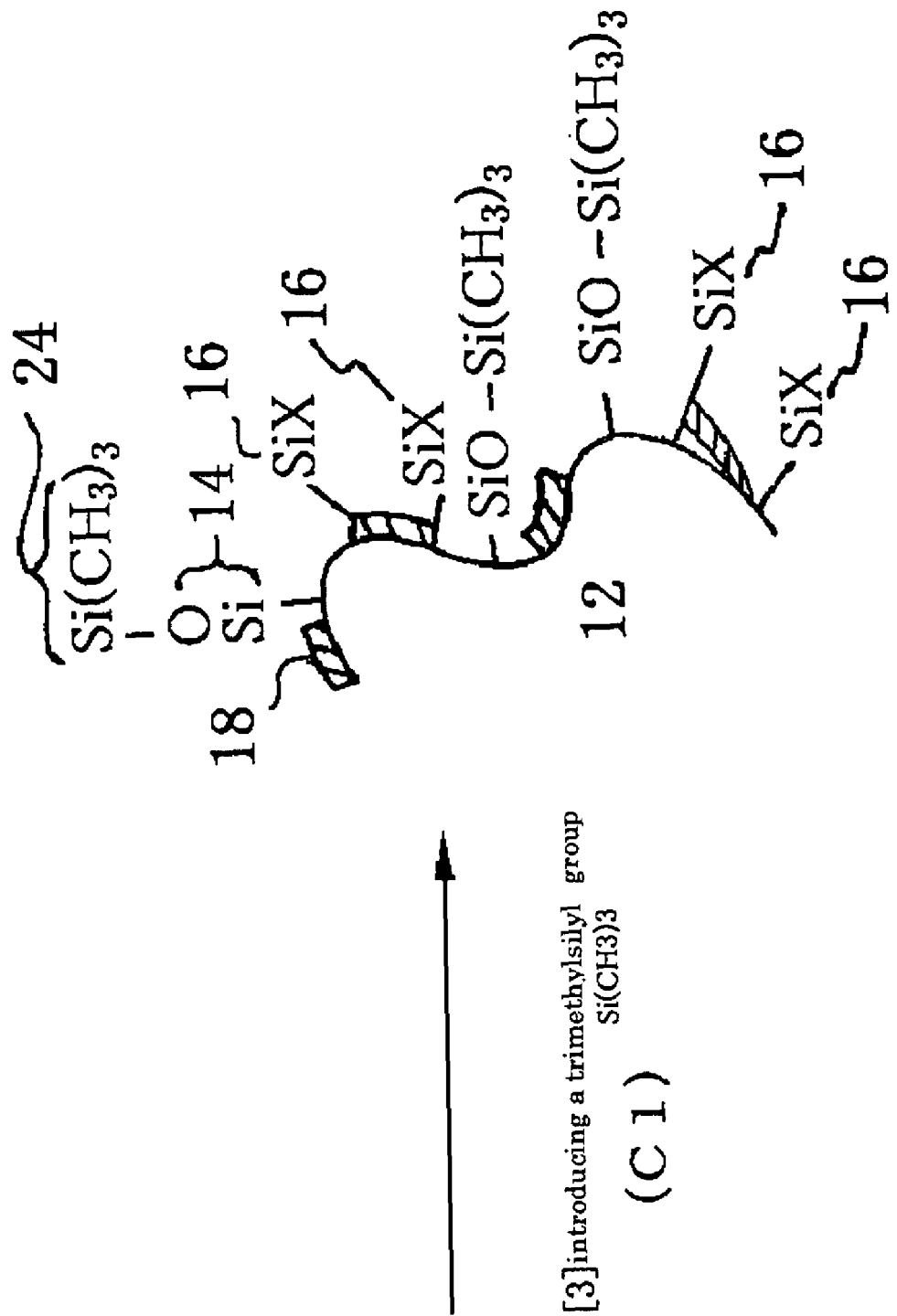

In the second embodiment of an inventive column packing material, a silica gel 12 is first reacted with a silane coupling agent having a chemical modification group 16 to introduce said chemical modification group 16 into a silanol group 14 on the surface of the silica gel (FIG. 4).

This step can be conducted similarly to Step (A) in the first embodiment.

Step (B1)

Figure 5:
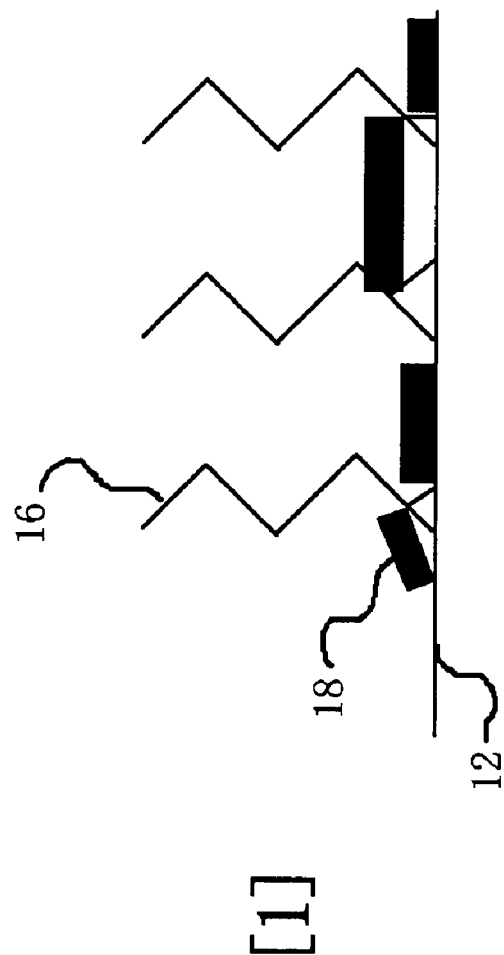
FIG. 5 shows a surface view of the second embodiment of column packing material of the invention.
Figure 5:
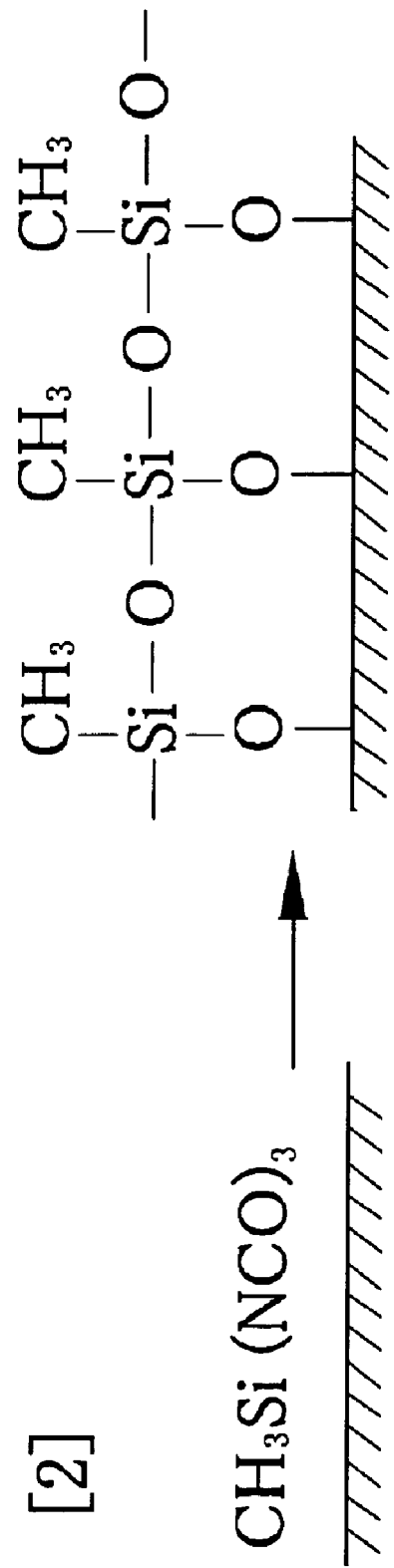

Then the silica gel modified chemically as describe above is brought into contact with a silyl isocyanate compound to effect a surface polymerization, whereby forming a silicone polymer 18 coating on the silica gel surface (FIG. 4). This coating is formed on a part of the silica gel surface (FIG. 5). Since this silicone coating serves to immobilize the chemical modification group introduced as described above onto the silica gel, the cleavage of the chemical modification group during the manufacturing step described below or during the use of the packing material can be prevented, whereby achieving an excellent durability. On the other hand, a partial exposure of the hydrophilic moiety of the silica gel yields a hydrophilic packing material.

A silyl isocyanate compound employed in the invention is one or more of those represented by Formula (VI):

$$[R_n{}^9Si(NCO)_{4-n}] \tag{VI}$$

wherein $R^9$ denotes, independently of each other, a hydrogen atom, an alkyl group having 1 to 10 carbon atoms, an alkoxyl group having 1 to 10 carbon atoms or a halogen atom, and n denotes 0 or integer of 1-3.

The term "hydrocarbon group" as any of $R^1$ to $R^6$ described above means a straight or branched, cyclic alkyl group, especially a lower alkyl group having 1 to 4 carbon atoms (such as methyl group, ethyl group, n-propyl group, n-butyl group); cycloalkyl group (such as cyclohexyl group); cycloalkenyl group (such as cyclohexenyl group); aryl group (such as phenyl group), naphthyl group; aryl substituted alkyl group (such as phenyl methyl group and phenyl ethyl group); and alkyl substituted aryl group (such as methyl phenyl group).

There are four types of silyl isocyanate compounds represented by Formula (VI) shown above. The first type is a tetraisocyanate which corresponds to Formula (VI) wherein n=0.

$$Si-(NCO)_4 \tag{VII}$$

The second type of said silyl isocyanate compounds is a triisocyanate which corresponds to Formula (VI) wherein n=1

For example, hydroxy silyl triisocyanate, methyl silyl triisocyanate, vinyl silyl triisocyanate, ethyl silyl triisocyanate, isopropyl silyl triisocyanate, n-propyl silyl triisocyanate, n-butyl silyl triisocyanate, phenyl silyl triisocyanate, methoxy silyl triisocyanate, ethoxy silyl triisocyanate, phenoxy silyl triisocyanate, chloro silyl triisocyanate, fluoro silyl triisocyanate can be listed. Among which methyl silyl triisocyanate, $R^9$ is a methyl group, is optimum.

The third type of said silyl isocyanate compounds is a diisocyanate which corresponds to Formula (VI) wherein n=2

For example, dihydroxy silyl diisocyanate, hydroxymethyl silyl diisocyanate, dimethyl silyl diisocyanate, divinyl silyl diisocyanate, diethyl silyl diisocyanate, diisopropyl silyl diisocyanate, diphenyl silyl diisocyanate, dimethoxy silyl diisocyanate, diethoxy silyl diisocyanate, diphenoxy silyl diisocyanate, dichloro silyl diisocyanate, difluoro silyl diisocyanate can be listed. Among which dimethyl silyl diisocyanate, $R^9$ is a methyl group, is optimum.

The fourth type of said silyl isocyanate compounds is a monoisocyanate which corresponds to Formula (VI) wherein n=3

For example, hydroxy dimethylsilyl isocyanate, trimethylsilyl isocyanate, trivinyl silyl isocyanate, triethyl silyl isocyanate, triisopropyl silyl isocyanate, triphenyl silyl isocyanate, trimethoxy silyl isocyanate, triethoxy silyl isocyanate, triphenoxy silyl isocyanate, trichloro silyl isocyanate, trifluoro silyl isocyanate can be listed. Among which trimethyl silyl isocyanate, $R^9$ is a methyl group, is optimum.

While the compounds of the four types described above are not limited particularly, triisocyanate compounds and tetraisocyanate compounds of types 1 and 2 are employed preferably.

In the invention, a silyl isocyanate compound described above may be employed alone or in a mixture of two or more.

A silyl isocyanate compound represented by Formula (VI) shown above is brought into contact with a silica gel in a gas or liquid phase.

The contact in the gas phase (gas phase treatment) may be accomplished for example by bringing the vapor of a silyl isocyanate compound described above in the state of a molecule into contact with the surface of a silica gel at a temperature of 300° C. or below using an air-tight container or by bringing a gaseous mixture of a silyl isocyanate compound described above and a carrier gas into contact with silica gel at a temperature of 300° C. or below.

On the other hand, the contract in the liquid phase (liquid phase treatment) may be accomplished for example by adding 0.01 to 1 parts by mass as a silyl isocyanate compound described above of a 1 to 50% by mass solution of the silyl isocyanate compound in a volatile solvent capable of dissolving the silyl isocyanate compound such as benzene, dichloromethane or chloroform, especially hexane, to 1 part by mass of a silica gel. In this case, the addition is made preferably with stirring.

The surface polymerization of a silyl isocyanate compound on the silica gel surface can be accomplished by allowing the silica gel which had been subjected to the contact treatment as described above to stand with or without stirring for a period of 2 hours or longer at a temperature of 50 to 300° C.

This surface polymerization can be conducted without any particular catalyst since it can be promoted by the effect of the surface active points of the silica gel itself. The term "active point" mentioned here means a point capable of catalyzing the polymerization of a silyl isocyanate compound having a hydrosilyl group, including an acid point, base point, oxidization point or reduction point. The surface polymerization takes place on a part of the active points on the silica gel surface.

When the activity of a silica gel itself is extremely low, then the silica gel before or after the contact treatment described above may be combined appropriately with an alkaline catalyst such as sodium hydroxide, potassium hydroxide, lithium hydroxide, ammonium hydroxide or calcium hydroxide prior to the polymerization.

When a silyl isocyanate compound is employed as in this embodiment, the silyl isocyanate bond (Si—NCO) is reacted chemically with the silica gel surface while the decomposition by-products being vaporized off, resulting in the formation only of the silicone polymer bound primarily onto the silica gel surface. The use for example of monomethylsilyl triisocyanate allows a monomethylpolysiloxane film to be formed on the silica gel surface (FIG. 5).

The monomethylpolysiloxane treatment can be effected also with trichloromethylsilane, trialkoxymethylsilane and the like, but the latter substances are not preferred practically since they pose a difficulty in terms of the treatment conditions and exhibit a poor reproducibility of the treatment.

The silylisocyanate bond (Si—NCO) is in the relationship of a structural isomerism with the siloxynitrole bond (Si—O—CN), and silyl isocyanate has a polarized form, which determines the reactivity unique to the Si—NCO.

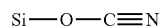  (VIII)

Siloxynitrile

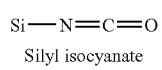 

Silyl isocyanate

-continued

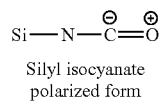

Silyl isocyanate polarized form

Since in the invention a silicone compound penetrates into micropores of the silica gel where it undergoes the polymerization with depositing to a part of the surface of the silica gel, an extremely thin coating of the silicone polymer is formed on the silica gel surface, which leads to an improved durability while keeping the characteristics of the silica gel and the chemical modification group.

The amount of a silyl isocyanate compound to be coated on the surface of a silica gel is preferably 0.1 to 50% by mass based on the mass of the silica gel. An amount exceeding 50% by mass leads to an insufficient polymerization which allows an increased amount of the silyl isocyanate compound to be just deposited on the silica gel surface or on a first chemical modification group, which is not preferable for a packing material. In addition, such an amount is not preferable as well since the hydrophilicity may be lost due to the entire coverage over the silica gel. An amount less than 0.1% by mass is not preferable since it results in a difficulty in immobilizing the first chemical modification group which may lead to a poor durability.

Step (C1)

In a silicone polymer-coated silica gel described above, a silanol group 14 is still remaining. The residual silanol group may lead to the adsorption of a basic substance and the like, which may result in a peak tailing.

Accordingly, the silanol group is sequestered by means of trimethylsilylation, whereby obtaining a column packing material exhibiting an extremely low effect of the silanol group 14 (FIG. 4).

Step (C1) in this second embodiment can be conducted similarly to Step (C) in the first embodiment described above.

In this embodiment, a column packing material having an excellent durability and a wide-ranged supporting ability which is not achieved by a conventional chemical bond type packing material can be obtained as a result of the combination of a first chemical modification group 16 in Step (A1) with the substituent $R^9$ on a silyl isocyanate compound represented by Formula (VI) shown above in Step (B1).

A conventional silica gel-based packing material may undergo a marked peak tailing resulting from a basic compound and the like because of the effect of a residual silanol group derived from the base silica gel. However, a column packing material according to the second embodiment of the invention exhibits an extremely reduced effect of the silanol group which is achieved by trimethylsilylation of a residual silanol group. In addition, the conventional silica gel-based packing material entails a durability problem because of the entirely exposed silica gel surface which leads to a poor deposition of a chemical modification group. However, a column packing material according to the second embodiment of the invention is imparted with a durability by applying a silicone polymer coating onto a part of the silica gel surface whereby immobilizing a chemical modification group, while it has a hydrophilicity because of a partial exposure of the hydrophilic moiety of the silica gel.

The preferred embodiments of the present invention will be explained hereinunder. Furthermore, this invention is not restricted by these embodiments.

EXAMPLE 1

[1] A 200 mL three-necked flask receives 20 g of a silica gel, which is dispersed with 80 mL of toluene and 3.164 g (0.04 mol) of pyridine. A condenser is fitted and the mixture is heated under reflux with stirring. 15.516 g (0.04 mol) is added dropwise via a dripping funnel, and after completion of the dropwise addition the heating under reflux is continued for 16 hours. Thereafter, the reaction mixture is filtered through a glass funnel. Then the mixture is washed with 200 mL of toluene and 200 mL of acetonitrile, and stirred with 100 mL of a 6:4 mixture of acetonitrile:water for 3 hours at room temperature, and then washed and filtered using 200 mL of methanol. The mixture is then dried under reduced pressure for 6 hours at 120° C. (chemical modification group introduction).

[2] Subsequently, 5 g of the chemically modified silica gel obtained above is placed in a pressure-resistant container, into which 2 g of 1,3,5,7-tetramethylcyclotetrasiloxane contained in a 10 mL screw tube is placed and purged with a nitrogen gas. After sealing tightly, the reaction is effected at 250° C. for 16 hours. Thereafter, the reactant is washed with 200 mL of chloroform and 200 mL of methanol, and then dried under reduced pressure for 4 hours at 60° C. (silicone coating).

[3] The silicone-coated silica gel obtained above is placed in a 2.4-litter desiccator, the bottom of which is covered with 100 mL of a 5% aqueous ammonia. After reacting at 60° C. for 16 hours, the reactant is washed with 100 mL of chloroform and 100 mL of acetone, and dried under reduced pressure for 4 hours at 120° C. (hydrosilyl group crosslinking).

[4] The alkali-treated silica gel obtained above is combined with 0.9 mL of trimethylchlorosilane, 1.6 mL of hexamethyldisilazane, 1.5 mL of pyridine and 15 mL of toluene, and reacted for 5 hours with heating under reflux. After washing with 200 mL of toluene, 200 mL of chloroform and 200 mL of methanol, the reactant is dried under reduced pressure for 2 hours at 60° C. (trimethylsilylation).

Comparative 1

A column packing material obtained by binding a trifunctional silane coupling agent (octadecyl group) directly to a silica gel and then coating with a silicone compound containing no hydrosilyl group followed by trimethylsilylation (polymeric packing material).

Comparative 2

A column packing material obtained by binding a monofunctional silane coupling agent (octadecyl group) directly to a silica gel and then followed by trimethylsilylation (monomeric packing material).

<Durability Test>
The durability of the column to which each of the packing materials of EXAMPLE 1 and COMPARATIVE 1 and 2 is packed are compared as detailed below.

Durability Test Conditions
Mobile Phase:
A: 2% Aqueous solution of trifluoroacetic acid (pH=1.0)
B: 2% acetonitrile solution of trifluoroacetic acid
Ratio of B: 65% (0 to 20 min)...0% (20 to 80 min)...98% (80 to 85 min)...65% (85 to 90 min)
Temperature: 60° C.
Flow rate: 1 mL/min (Total)
Detection: UV 254 nm
Sample: Uracil, propylbenzene, butylbenzene, amylbenzene, propyl benzoate (each 1000 ppm, 65% acetonitrile solution mixture).
Injection volume: 7 µL
Column size: 4.6 mm in diameter, 150 mm in length Test Method
Employing a 90-minute cycle of the change in the ratio of Mobile phase B, the cycle is repeated 15 times. At the stage of the former 65% of each cycle, the sample is injected.

The durability is evaluated based on the comparison of the amylbenzene supporting ability between the initial time and each time.

Figure 6:
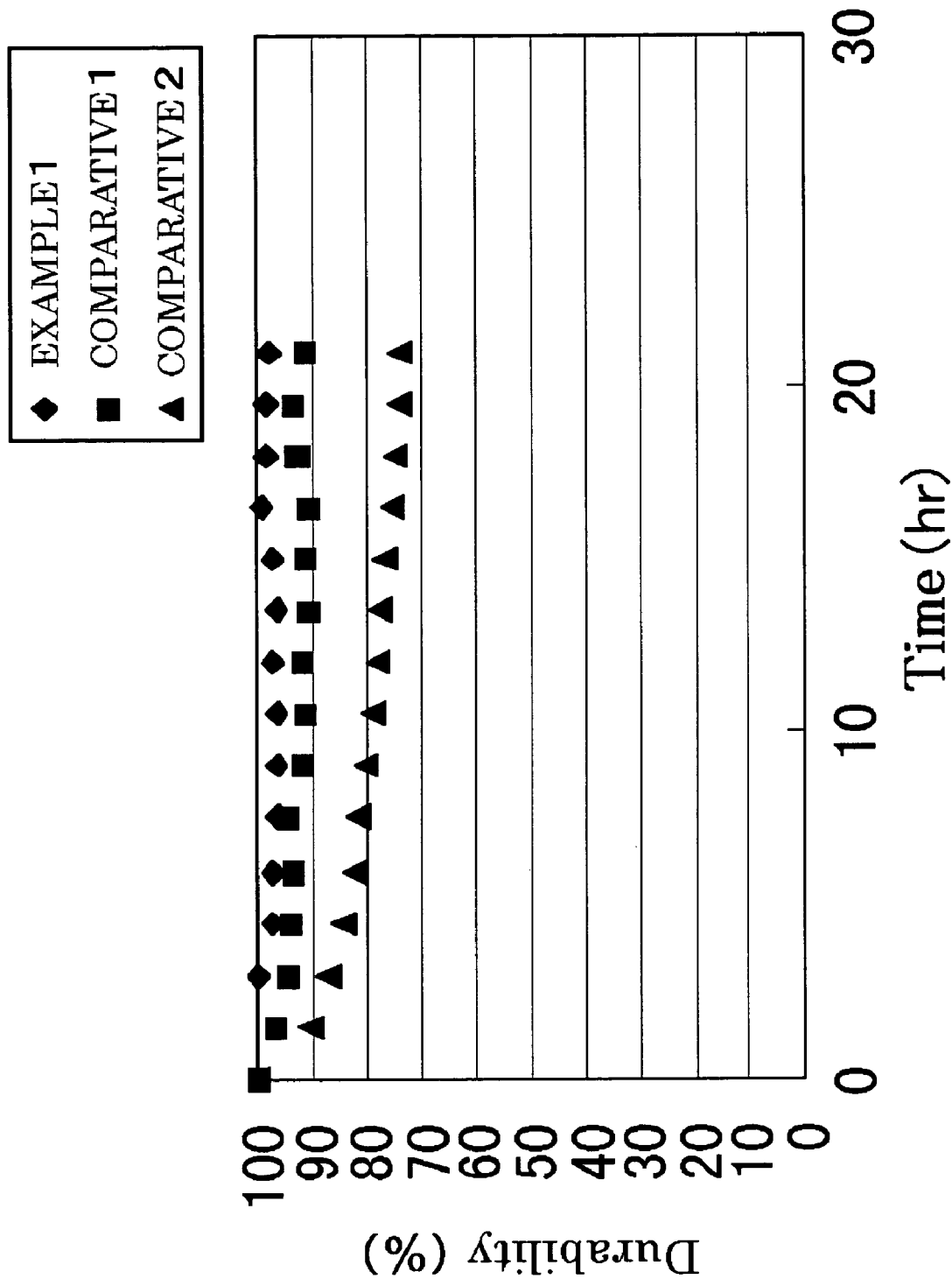
FIG. 6 shows the comparison of the durability of columns.

Results
The results of the durability comparison are shown in FIG. 6.

As evident from FIG. 6, the column packed with the column packing material of EXAMPLE 1 obtained by coating the silica gel with the silicone compound containing the hydrosilyl group was proven to have an excellent durability when compared with the columns packed with the column packing material of COMPARATIVE 1 coated with the silicone compound containing no hydrosilyl group and the column packing material of COMPARATIVE 2 which was not coated with any polymer. These findings may be due to the network of the silicone polymer coating over substantially the entire surface of the silica gel of the column packing material of EXAMPLE 1.

EXAMPLE 2

[1] A 200 mL three-necked flask receives 15 g of a silica gel, which is dispersed with 75 mL of toluene and 3.164 g (0.04 mol) of pyridine. A condenser is fitted and the mixture is heated under reflux with stirring. 11.637 g (0.04 mol) is added dropwise via a dripping funnel, and after completion of the dropwise addition the heating under reflux is continued for 16 hours. Thereafter, the reaction mixture is filtered through a glass funnel. Then the mixture is washed with 150 mL of toluene and 150 mL of acetonitrile, and stirred with 75 mL of a 6:4 mixture of acetonitrile:water for 3 hours at room temperature, and then washed and filtered using 150 mL of methanol. The mixture is then dried under reduced pressure for 6 hours at 120° C. (chemical modification group introduction).

[2] Subsequently, 5 g of the chemically modified silica gel obtained above is placed in a pressure-resistant container, into which 0.82 g of monomethyl silyl isocyanate (MMSI) contained in a 10 mL screw tube is placed and purged with a nitrogen gas. After sealing tightly, the reaction is effected at 250° C. for 16 hours. Thereafter, the reactant is washed with 100 mL of chloroform and 100 mL of methanol, and then dried under reduced pressure for 4 hours at 60° C. (silicone coating).

[3] The monomethylsilicone polymer coating silica gel obtained above is combined with 0.9 mL of trimethylchlorosilane, 1.6 mL of hexamethyldisilazane, 1.6 mL of pyridine and 15 mL of toluene, and reacted for 5 hours with heating under reflux. After washing with 100 mL of toluene, 100 mL of chloroform and 100 mL of methanol, the reactant is dried under reduced pressure for 4 hours at 80° C. (trimethylsilylation).

Comparative 3

A column packing material subjected to the steps [1] chemical modification group incorporation and [3] trimethylsilylation as in EXAMPLE 2.

<Durability Test>

The durability of the columns packed with the column packing materials of EXAMPLE 2 and COMPARATIVE 3 were compared as described above.

Results

Figure 7:
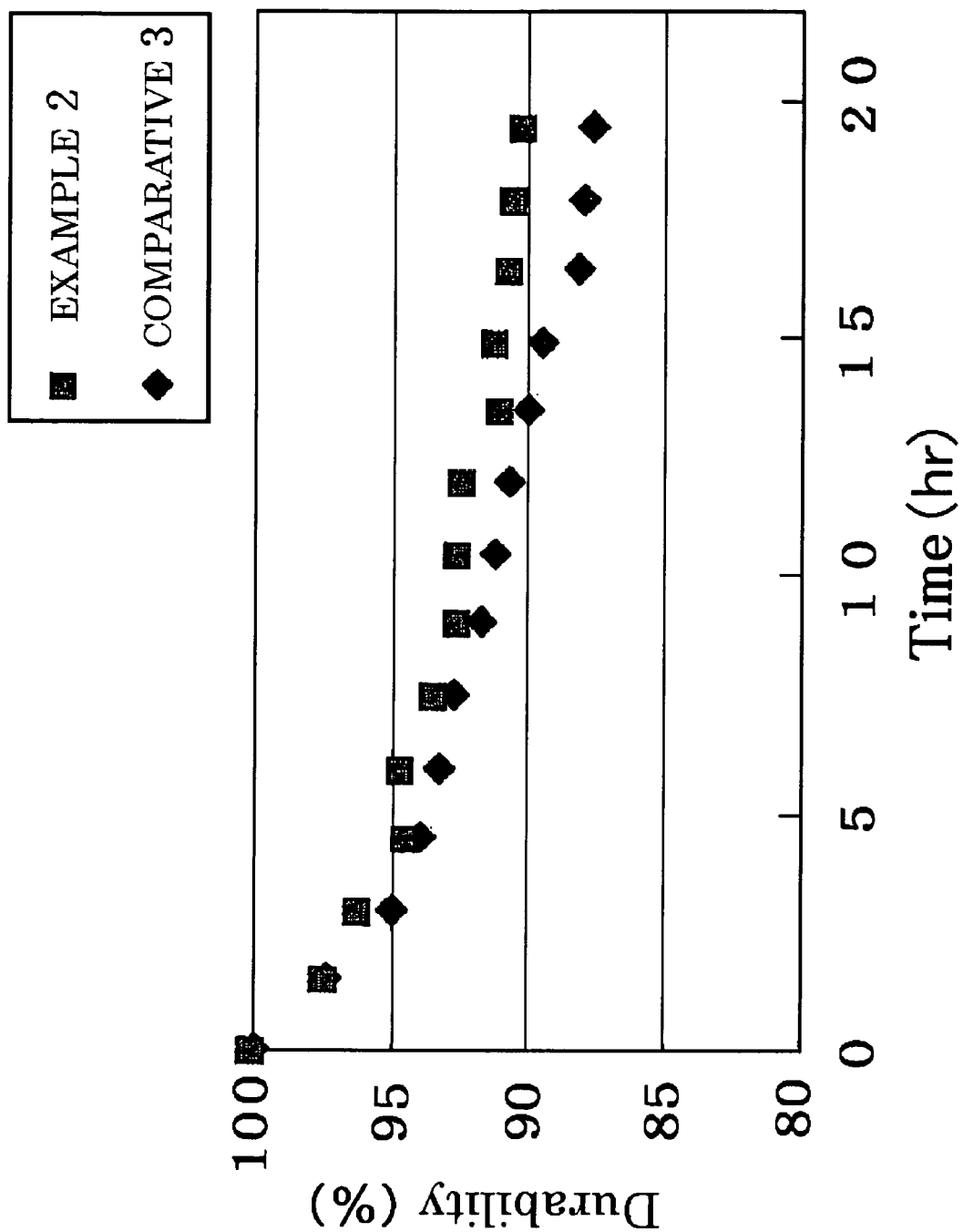
FIG. 7 shows the comparison of the durability of columns.
Figure 8:
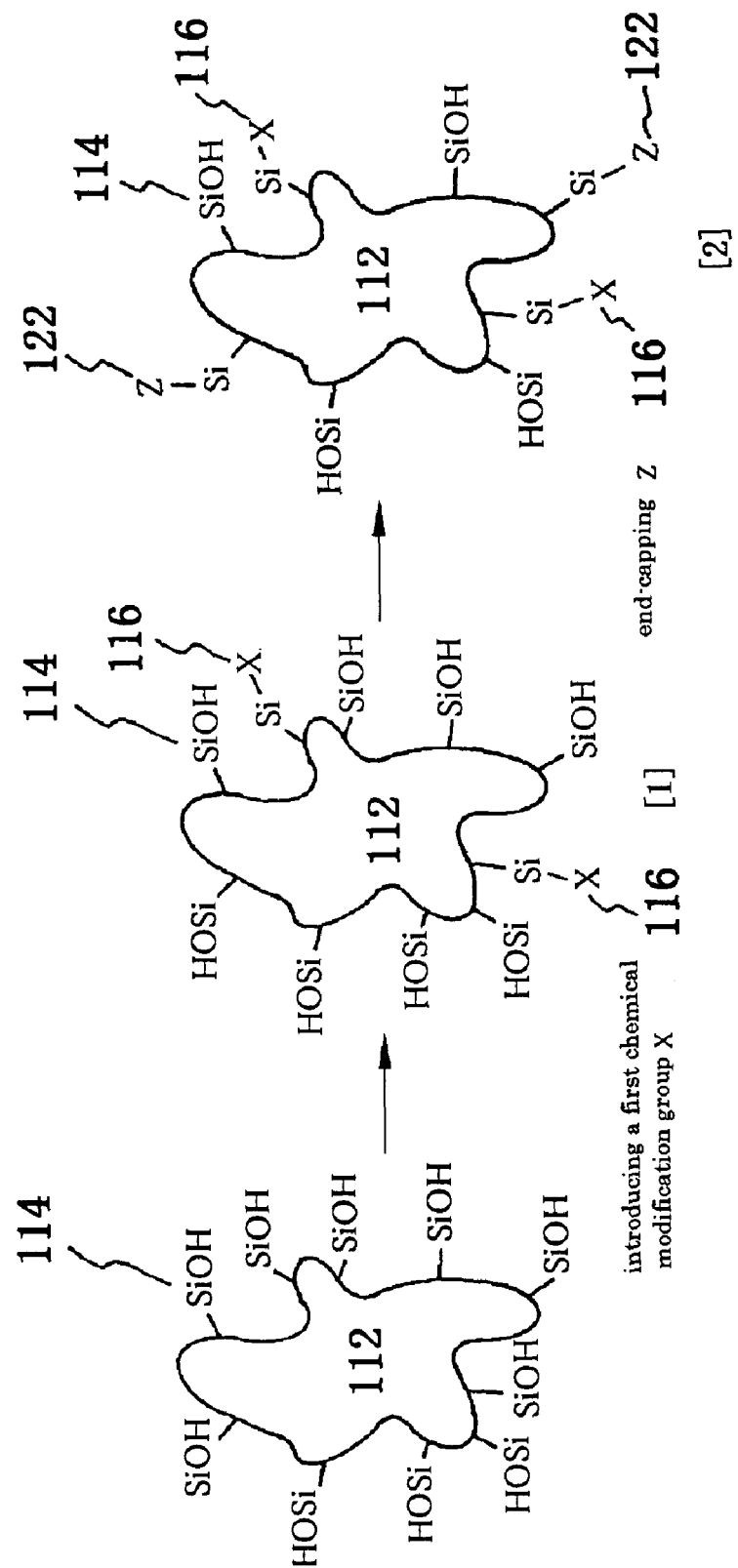
FIG. 8 shows the schematic view of a conventional column packing material.

The results of the durability comparison are shown in FIG. 7.

As evident from FIG. 7, the column packed with the column packing material of EXAMPLE 2 obtained by introducing a chemical modification group followed by coating a part of the silica gel surface with the silicone polymer and trimethylsilylating the residual silanol groups was proven to have an excellent durability when compared with the column packed with the column packing material of COMPARATIVE 3 which was not coated partially with the silicone polymer.

These findings may be due to the immobilization of the chemical modification group by the silicone polymer coating on the silica gel surface.

The hydrophilicity was revealed to be imparted since the silicone polymer coating was formed only on a part of the silica gel surface whereby allowing a part of the hydrophilic moiety of the silica gel to be exposed.

As discussed above, according to the invention, a column packing material having an excellent durability and exhibits an extremely low effect of a residual silanol group can be obtained by coating the surface of a chemical modification group-introduced silica gel with a silicone polymer consisting of a silicone compound followed by trimethylsilylating the residual silanol group.

What is claimed is:

1. A column packing material comprising:
   a silica gel having at least a silanol group which is bound to a first chemical modification group;
   a silicone polymer consisting of 1,3,5,7-tetramethylcyclotetrasiloxane monomers having at least 2 or more hydrosilyl groups;
      wherein said 1,3,5,7-tetramethylcyclo-tetrasiloxane monomers are polymerized and crosslinked with each other to coat substantially the entire surface of said silica gel to form a silicone polymer-coated silica gel, which has at least a residual hydrosilyl group remaining on said silicone polymer capable of being converted into a silanol group;
   wherein a trimethylsilyl group is bound to said silanol group converted from said residual hydrosilyl group of said silicone polymer and/or a silanol group on said silica gel which is not bound to said first chemical modification group; and
   wherein said first chemical modification group is a straight chain alkyl group having 1 to 30 carbon atoms, a branched hydrocarbon group, a cyclic hydrocarbon group, or a substituted hydrocarbon group wherein one or more of hydrogen atoms are substituted by a cyano group, a hydroxyl group, a carboxyl group, an acid amide group, an imide group, a sulfonyl group, an amino group or a glyceroyl group.

2. A column packing material according to claim 1, wherein a second chemical modification group is bound to said residual hydrosilyl group on said silicone polymer.

3. A column packing material according to claim 2, wherein said second chemical modification group is an ion exchange group.

4. A column packing material according to claim 2, wherein said second chemical modification group is a vinyl compound which is selected from the group consisting of an ethylene, an α-olefin compound, a symmetric vinyl compound or asymmetric vinyl compound.

5. A column packing material according to claim 1, wherein said first chemical modification group is a triacontyl group, an octadecyl group, an octyl group, a phenyl group, a cyano group, a methyl group or an epoxy group.

6. The column packing material according to claim 1, wherein said residual hydrosilyl group is further crosslinked to each other.

7. The column packing material according to claim 6, wherein said residual hydrosilyl group is crosslinked by a crosslinking catalyst which is one selected from the group consisting of sodium hydroxide, potassium hydroxide, calcium hydroxide, ammonium hydroxide, lithium hydroxide, sodium carbonate, dibutyltin, and tibutylamine.

8. A method for producing a column packing material, comprising:
   binding a first chemical modification group to a silanol group on the surface of a silica gel by reacting the silica gel with a silane coupling agent having said first chemical modification group;
   coating a silicone polymer on the surface of said silica gel; wherein the silicone polymer is formed by polymerizing and crosslinking 1,3,5,7-tetramethylcyclotetrasiloxane monomers on the surface of the silica gel; and
   trimethylsilylating a silanol group on said silicone polymer and/or a silanol group on said silica gel using an end-capping agent,
   wherein said first chemical modification group is a straight chain alkyl group having 1 to 30 carbon atoms, a branched hydrocarbon group, a cyclic hydrocarbon group, or a substituted hydrocarbon group wherein one or more of hydrogen atoms are substituted by a cyano group, a hydroxyl group, a carboxyl group, an acid amide group, an imide group, a sulfonyl group, an amino group or a glyceroyl group.

9. The method for producing a column packing material according to claim 8, further comprising a step for crosslinking a residual hydrosilyl group on said silicone polymer.

10. A method for producing a column packing material, comprising:
   binding a first chemical modification group to a silanol group on the surface of a silica gel by reacting the silica gel with a silane coupling agent having said first chemical modification group;
   coating a silicone polymer on substantially the entire surface of said silica gel; wherein the silicone polymer is formed by polymerizing and crosslinking 1,3,5,7-tetramethylcyclotetrasiloxane monomers as a network;
   binding a second chemical modification group to said silicone polymer by reacting a vinyl compound having said second chemical modification group; and
   trimethylsilylating a silanol group generated from a residual hydrosilyl group on said silicone polymer using an end-capping agent;
   wherein said first chemical modification group is a straight chain alkyl group having 1 to 30 carbon atoms, a branched hydrocarbon group, a cyclic hydrocarbon group, or a substituted hydrocarbon group wherein one or more of hydrogen atoms are substituted by a cyano group, a hydroxyl group, a carboxyl group, an acid amide group, an imide group, a sulfonyl group, an amino group or a glyceroyl group.

11. The method for producing a column packing material according to claim 10, further comprising a step for crosslinking a residual hydrosilyl group on said silicone polymer.

* * * * *